(12) United States Patent
Stephens et al.

(10) Patent No.: US 9,573,687 B2
(45) Date of Patent: Feb. 21, 2017

(54) LATERALLY-EXPANDING TRAY TABLE

(71) Applicant: B/E Aerospace, Inc., Wellington, FL (US)

(72) Inventors: Benjamin D. Stephens, Atlanta, GA (US); Mark A. Kruse, Atlanta, GA (US); Francis X. Garing, Atlanta, GA (US)

(73) Assignee: B/E AEROSPACE, INC., Wellington, FL (US)

( * ) Notice: Subject to any disclaimer, the term of this patent is extended or adjusted under 35 U.S.C. 154(b) by 0 days.

(21) Appl. No.: 14/639,436

(22) Filed: Mar. 5, 2015

(65) Prior Publication Data

US 2015/0284090 A1 Oct. 8, 2015

Related U.S. Application Data

(60) Provisional application No. 61/976,212, filed on Apr. 7, 2014.

(51) Int. Cl.
 *A47B 83/02* (2006.01)
 *B64D 11/06* (2006.01)
 *B64D 11/00* (2006.01)
 *B60N 3/00* (2006.01)

(52) U.S. Cl.
 CPC ........... *B64D 11/0638* (2014.12); *B60N 3/004* (2013.01); *B64D 11/00151* (2014.12)

(58) Field of Classification Search
 CPC ................... B64D 11/0638; B64D 11/00151; B60N 3/004
 USPC ....... 297/135, 146, 160, 161, 162, 163, 170, 297/171, 172, 173, 174 R, 147
 See application file for complete search history.

(56) References Cited

U.S. PATENT DOCUMENTS

| | | | | |
|---|---|---|---|---|
| 3,773,381 A | * | 11/1973 | Brennan | A47C 7/70 297/163 X |
| 4,159,071 A | * | 6/1979 | Roca | A47C 7/70 297/146 X |
| 4,944,552 A | * | 7/1990 | Harris | A47C 7/70 297/145 |
| 5,092,652 A | * | 3/1992 | Macaluso | A47B 13/16 297/146 X |

(Continued)

FOREIGN PATENT DOCUMENTS

| | | | |
|---|---|---|---|
| DE | 91 07 375.8 U1 | 9/1991 | |
| DE | EP 1683719 A1 * | 7/2006 | ............. B64D 11/06 |

(Continued)

OTHER PUBLICATIONS

International Search Report carried out by ISA/US for PCT/US15/18900 dated Jun. 12, 2015.

*Primary Examiner* — Rodney B White
(74) *Attorney, Agent, or Firm* — Oblon, McClelland, Maier & Neustadt, L.L.P.

(57) ABSTRACT

A seat back tray table that includes an arm assembly attached to a seat having a seat back, and moveable between a stowed position and a deployed, use position, a first table segment carried by the arm assembly and moveable with the arm assembly between a stowed position against a stowage area of the seat back and a deployed position aft of the stowage area, and a second table segment carried by the first table segment and moveable between a stored position within the stowage area of the seat back and a deployed position laterally-extended from the first table segment to increase the total surface area of the tray table.

4 Claims, 5 Drawing Sheets

(56) References Cited

U.S. PATENT DOCUMENTS

| | | | | |
|---|---|---|---|---|
| 5,170,720 | A * | 12/1992 | Scheurer | B60N 3/002 297/135 X |
| 5,370,060 | A * | 12/1994 | Wang | B60N 3/004 297/163 X |
| 5,547,247 | A * | 8/1996 | Dixon | A47C 7/70 297/162 X |
| 5,876,092 | A * | 3/1999 | An | B60N 3/004 297/146 |
| 6,085,666 | A | 7/2000 | Anderson et al. | |
| 6,776,452 | B2 * | 8/2004 | Onishi | A47B 83/02 297/170 |
| 6,860,550 | B2 * | 3/2005 | Wojcik | B60N 2/206 297/163 X |
| 7,281,762 | B1 * | 10/2007 | Getfield | B60N 3/004 297/163 |
| 7,306,282 | B2 * | 12/2007 | Salzer | A47C 7/70 297/146 X |
| 7,311,354 | B2 * | 12/2007 | Giasson | B64D 11/0638 297/162 X |
| 7,506,923 | B1 * | 3/2009 | Gauss | B60N 3/002 297/149 |
| 7,621,593 | B2 * | 11/2009 | Dickinson | B60N 3/004 297/146 |
| 8,826,830 | B2 * | 9/2014 | Pajic | A47C 7/70 297/163 X |
| 8,997,660 | B2 * | 4/2015 | Satterfield | B60N 3/001 297/146 X |
| 9,180,805 | B2 * | 11/2015 | Millan | B60N 3/004 |
| 2009/0078169 | A1 * | 3/2009 | Osborne | A47B 5/006 108/40 |
| 2011/0148156 | A1 * | 6/2011 | Westerink | B64D 11/06 297/162 |
| 2012/0139303 | A1 * | 6/2012 | Westerink | B64D 11/0015 297/163 |
| 2013/0001987 | A1 * | 1/2013 | Heredia | B64D 11/0015 297/163 |
| 2015/0068435 | A1 * | 3/2015 | Maslakow | B64D 11/0638 108/42 |
| 2016/0221677 | A1 * | 8/2016 | Hance | B64D 11/0638 |
| 2016/0221678 | A1 * | 8/2016 | Maillaut | B64D 11/0605 |

FOREIGN PATENT DOCUMENTS

| | | |
|---|---|---|
| EP | 1 683 719 A1 | 7/2006 |
| JP | 2008168884 A2 | 7/2008 |
| WO | WO 2011/089558 A1 | 7/2011 |
| WO | WO 2015/002609 A1 | 1/2015 |

* cited by examiner

LATERALLY-EXPANDING TRAY TABLE

PRIORITY CLAIM AND CROSS-REFERENCE TO PRIOR-FILLED APPLICATION

This application claims priority to U.S. Provisional Patent Application Ser. No. 61/976,212 filed Apr. 7, 2014, the contents of which are incorporated into this application in full by reference.

TECHNICAL FIELD AND BACKGROUND OF THE INVENTION

This invention relates to a tray table of the type found on transportation seating products, such as railway and aircraft passenger seats. Prior art tray tables typically extend the width of a seat back, and are moveable between a stowed position flush with and latched to the seat back of a seat and a deployed position with the tray table extending away from the seat back in a generally horizontal position for use by an aft-seated occupant. Other prior art seats include bi-fold tray tables that are hinged in the middle and are typically stowed in a folded configuration in an armrest. To deploy the table, the arm cap is raised, the table pivoted out of a storage cavity in the armrest, pivoted laterally across the lap of the seat occupant, after which the table is unfolded at the hinge to form a full width tray table.

The invention presents an advance over the prior art because it allows configurations in the areas not occupied by the table when stowed that are not possible with a typical fore/aft expanding bifold table. In a typical prior art bifold table, the aspect ratio of the table and the space it occupies when stowed is short and wide, which dictates a similar form factor to the space adjacent to it for items such as connectivity ports, in-flight entertainment ("IFE") remote control devices, and the like. Additionally, the novel designs allow for multiple table sizes depending on how far the moving component is extended. This design also eases ingress and egress when the table is in its reduced-size configuration, while at the same time providing a usable table. Furthermore, the table gives the passenger more leg space when in the reduced size configuration, enabling the occupant to more easily and comfortably assume seating positions such as where the passenger has crossed his or her legs.

In embodiments of the invention disclosed in this application, tray tables are described and illustrated that can increase or decrease in size laterally in order to allow the table to reduce in size for stowage, provide increased passenger space and ease of ingress and egress. The novel features also enable different table configurations for components incorporated into in the seat back, enabling taller items to be stowed. Items such as personal electronic devices or IFE controllers can therefore more readily occupy this additional space.

The means of increasing size can be accomplished in a multitude of ways, however the core principle is that the tray table has a first table segment that remains stationary relative to a second, deployable and stowable table segment that moves to increase the size of the table. The tray table is adaptable to any type of passenger seat, particularly aircraft passenger seats of the type that include a base for attachment to an aircraft cabin deck, a frame mounting a seat bottom and seat back, including seat backs that have recline mechanisms that permit the seat back to move between a full upright taxi, take-off and landing position and a recline position. Such seats are typically constructed to permit movement of the seat back without moving the tray table carried by the seat.

SUMMARY OF THE INVENTION

Therefore, it is therefore an object of the present invention to provide a seat back tray table that can increase in size between a stowed position and a deployed use position.

It is another object of the invention to provide a seat back tray table that allows configurations in the areas not occupied by the table when stowed that are not possible with a typical fore/aft expanding bifold table.

It is another object of the invention to provide a seat back tray table that allows for multiple table sizes depending on how far the movable table segment is extended.

It is another object of the invention to provide a seat back tray table that eases ingress and egress when the table is in a reduced-size configuration, while at the same time providing a usable table.

It is another object of the invention to provide a seat back tray table that gives the passenger more leg space when in the reduced size configuration, for seating positions such as where the passenger has crossed his or her legs.

These and other objects and advantages of the invention are achieved by providing a seat back tray table that includes an arm assembly attached to a seat having a seat back, and moveable between a stowed position and a deployed, use position. A first table segment is carried by the arm assembly and moveable with the arm assembly between a stowed position against a stowage area of the seat back and a deployed position aft of the stowage area. A second table segment is carried by the first table segment and moveable between a stored position within or proximate to the stowage area of the seat back and a deployed position laterally-extended from the first table segment to increase the total surface area of the tray table.

According to another embodiment of the invention, a pocket is positioned on a bottom side of the first table segment, and the second table segment in its stored position is telescoped into the pocket in the first table segment and adapted to be translated laterally outwardly from the pocket into the deployed, use position.

According to another embodiment of the invention, a pocket is positioned on a bottom side of the first table segment, and the second table segment is mounted for pivotal movement on a vertical axis and in its stored position is rotated into the pocket in the first table segment and adapted to be rotated laterally on the vertical axis outwardly from the pocket into the deployed, use position.

According to another embodiment of the invention, a hinge is positioned on a fore and aft-extending side edge of the first table segment, and the second table segment is mounted for pivotal movement of the hinge between a stored position on top of the first table segment and a deployed, use position laterally offset from and in the same horizontal plane as the first table segment.

According to another embodiment of the invention, the width of the tray table in its fully stowed position is about one-half of the width of the seat back and in its fully deployed position is substantially the entire width of the seat back.

According to another embodiment of the invention, the second table segment is adapted to be partially deployed whereby the width of the tray table is greater than one-half of the width of the seat back and less than the entire width of the seat back.

According to another embodiment of the invention, an aircraft passenger seat is provided that includes a seat back and a seat back tray table that includes an arm assembly attached to the seat and moveable between a stowed position and a deployed, use position. A first table segment is carried by the arm assembly and moveable with the arm assembly between a stowed position against an stowage area of the seat back and a deployed position aft of the stowage area. A second table segment is carried by the first table segment and moveable between a stored position within or proximate the stowage area of the seat back when the first table segment is in its stowed position, and an extended position laterally-extended from the first table segment to increase the total surface area of the tray table when the first table segment is in its deployed position.

According to another embodiment of the invention, the width of the tray table in its fully stowed position is about one-half of the width of the seat back and in its fully deployed position is substantially the entire width of the seat back.

According to another embodiment of the invention, the second table segment is adapted to be partially deployed whereby the width of the tray table is greater than one-half of the width of the seat back and less than the entire width of the seat back.

According to another embodiment of the invention, the seat back includes passenger convenience devices positioned on about one-half of the width of the seat back not occupied by the tray table in its stowed position.

According to another embodiment of the invention, the passenger convenience devices are selected from the group consisting of an electronic device connectivity port, in-flight entertainment ("IFE") remote control device, and storage pocket for personal belongings.

BRIEF DESCRIPTION OF THE DRAWING FIGURES

The present invention is best understood when the following detailed description of the invention is read with reference to the accompanying drawings, in which.

Figure 4:
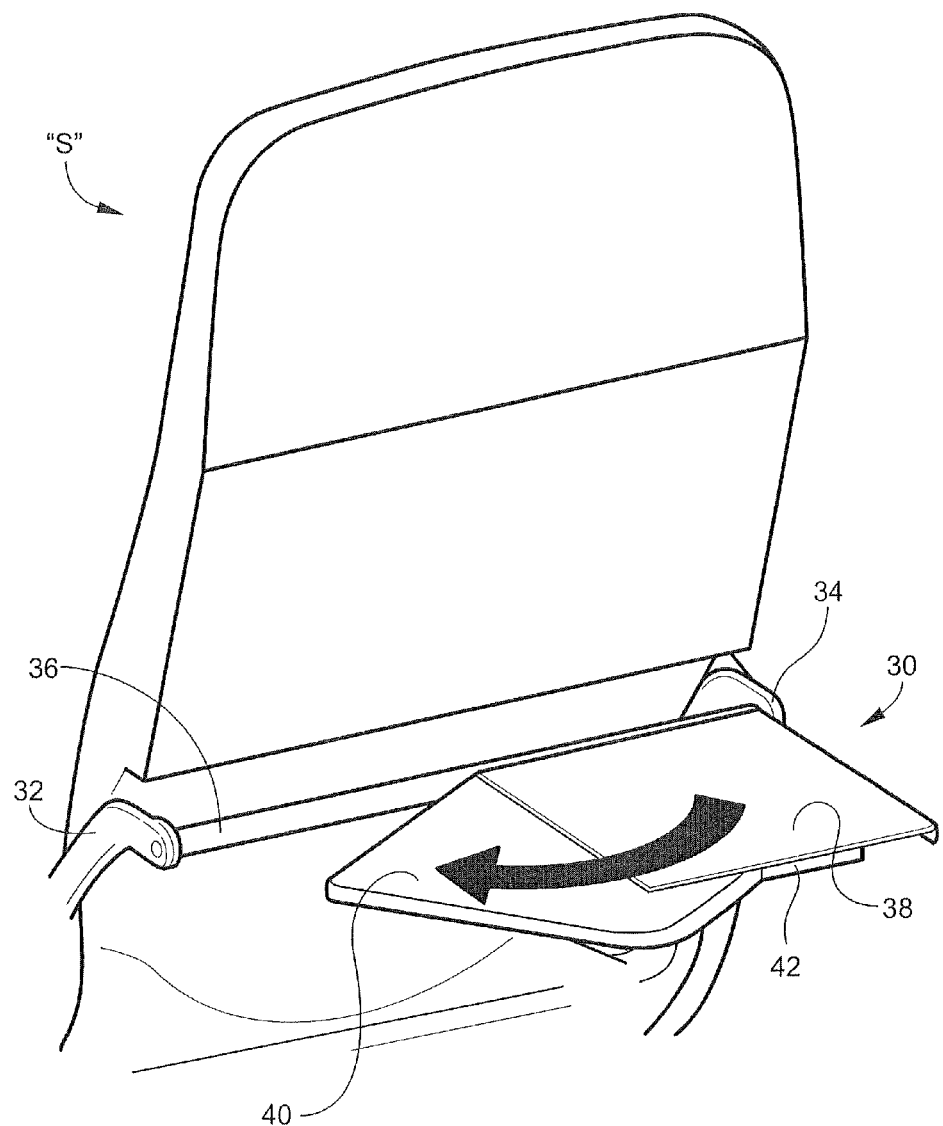
Figure 5:
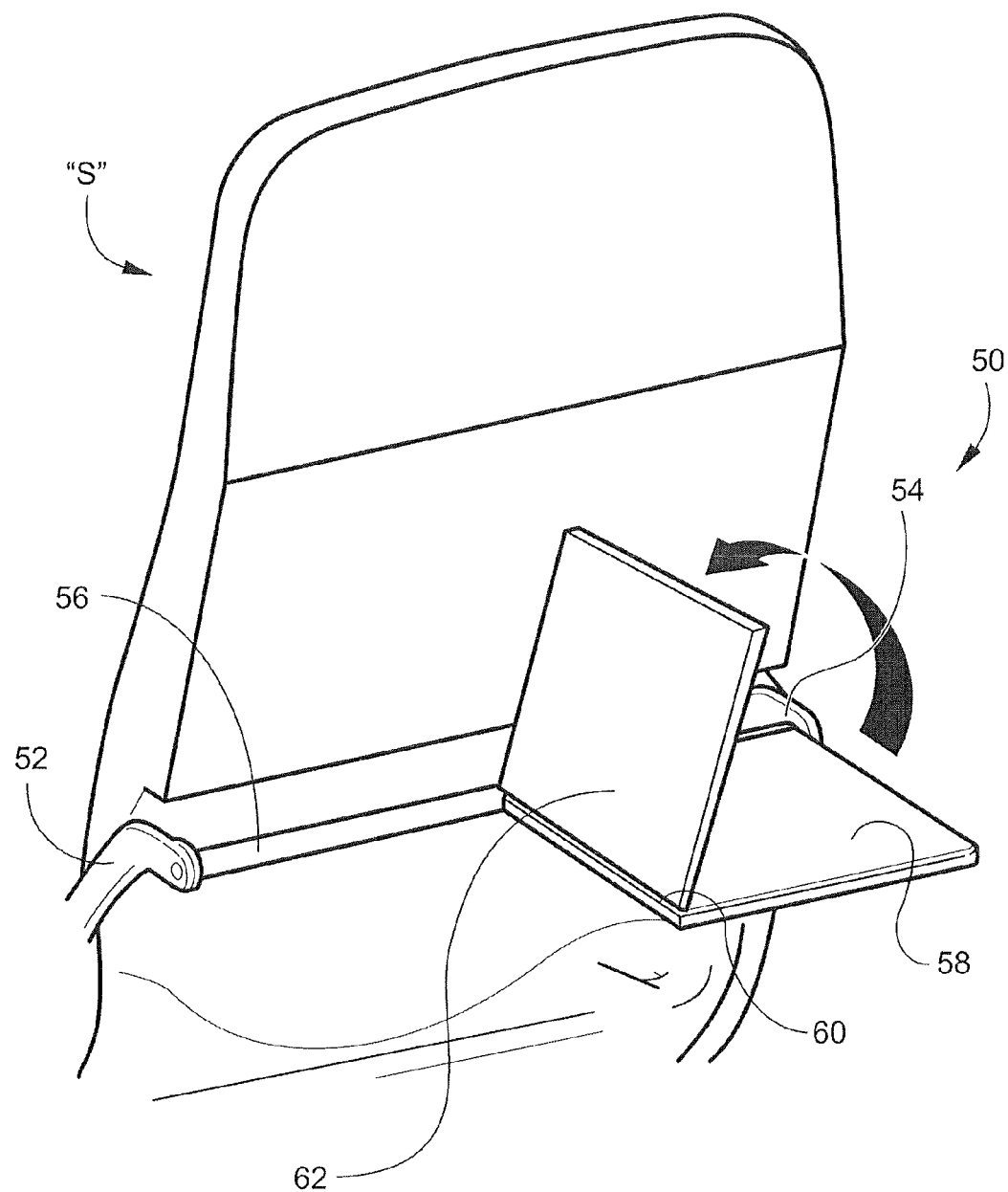

FIG. 4 is a is a perspective view of the seat back portion of an aircraft passenger seat showing a pivoting tray table according to another preferred embodiment of the invention as it is being extended laterally from its stowed position into the enlarged, deployed position; and FIG. 5 is a perspective view of the seat back portion of an aircraft passenger seat showing a bi-fold tray table according to a further preferred embodiment of the invention as it is being moved to its stowed position from the deployed position.

DETAILED DESCRIPTION OF THE PREFERRED EMBODIMENT

Figure 1:
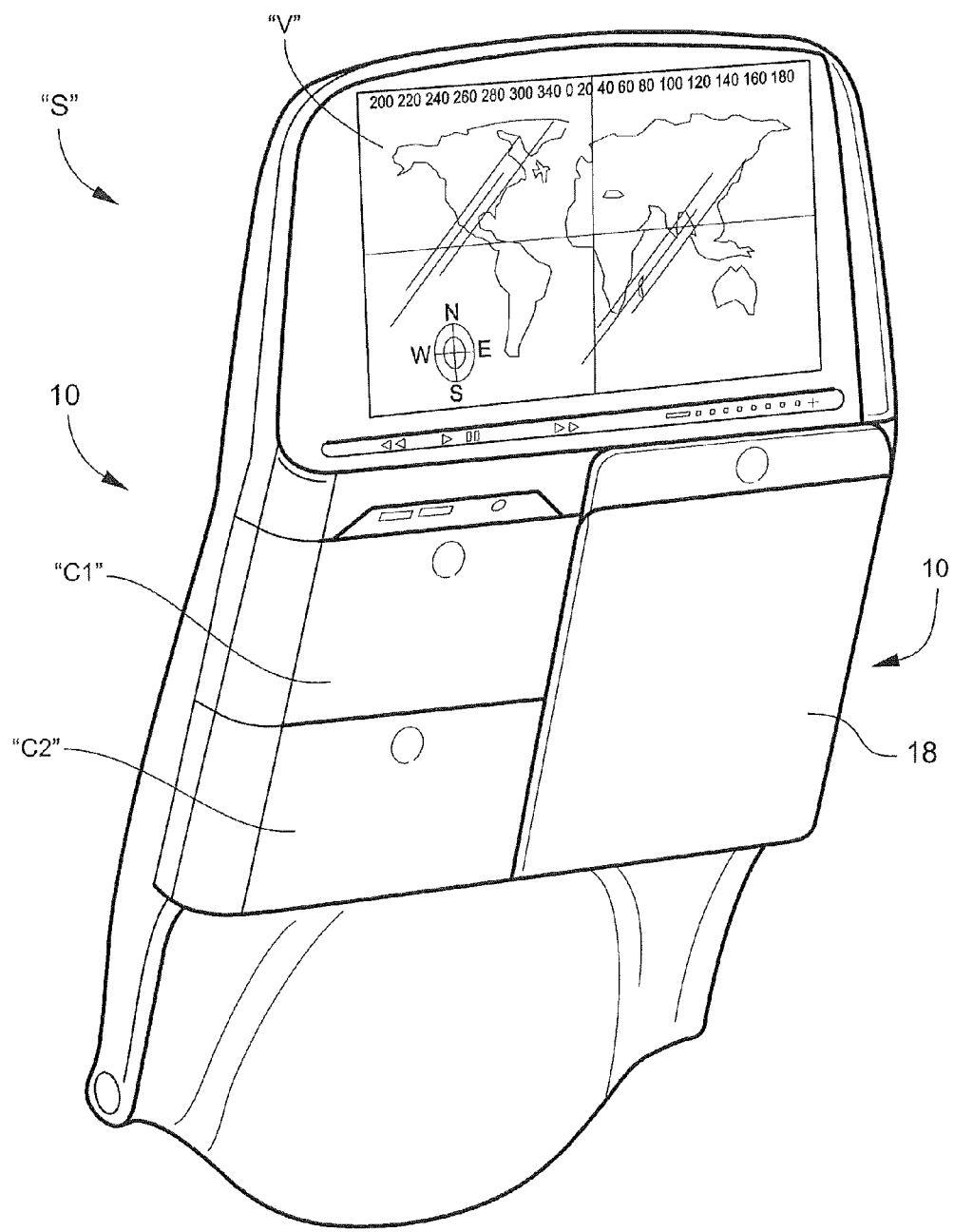
FIG. 1 is a perspective view of the seat back portion of an aircraft passenger seat showing a telescoping tray table according to one preferred embodiment of the invention in its stowed position against the seat back.

Referring now to FIG. 1, a seat back "S" is shown of the general type found in main and business cabin areas of commercial aircraft, to which is mounted a tray table 10 according to one embodiment of the present invention. As shown, the first table segment 18 in its stowed position occupies one side of the rear of the seat back "S", leaving the other side for containing IFE or other occupant convenience features "C1" and "C2". As also shown, the seat back "S" is provided with a video monitor "V" that includes reverse, play, pause/stop, fast forward and volume controls positioned below the video monitor "V" and above the level of the tray table 10.

In the following FIGS. 2-5 the video monitor "V" and convenience features "C1" and "C2" have been removed for clarity in describing and illustrating the tray table 10.

Figure 2:
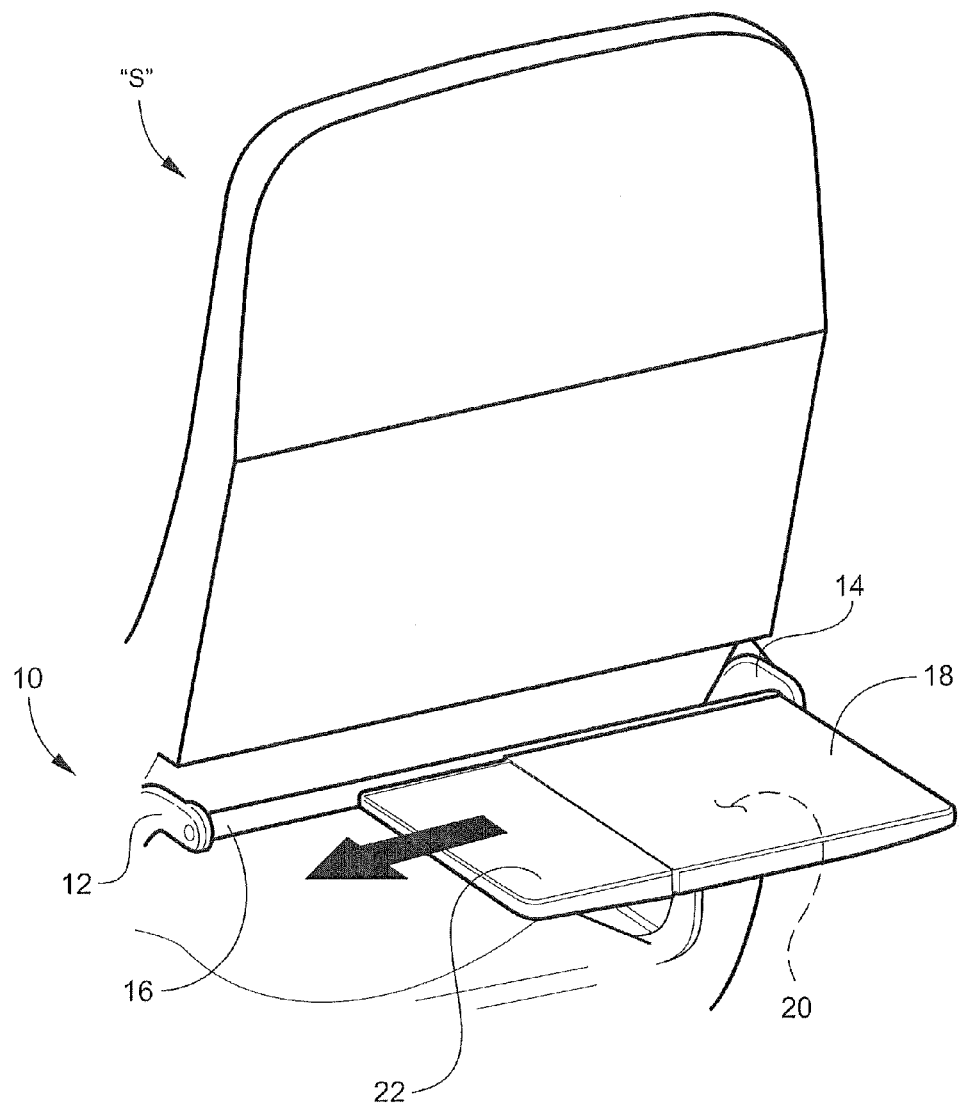
FIG. 2 is a perspective view of the seat back portion of an aircraft passenger seat showing a tray table according to one preferred embodiment of the invention as it is being extended laterally from its stowed position into the enlarged, deployed position.
Figure 3:
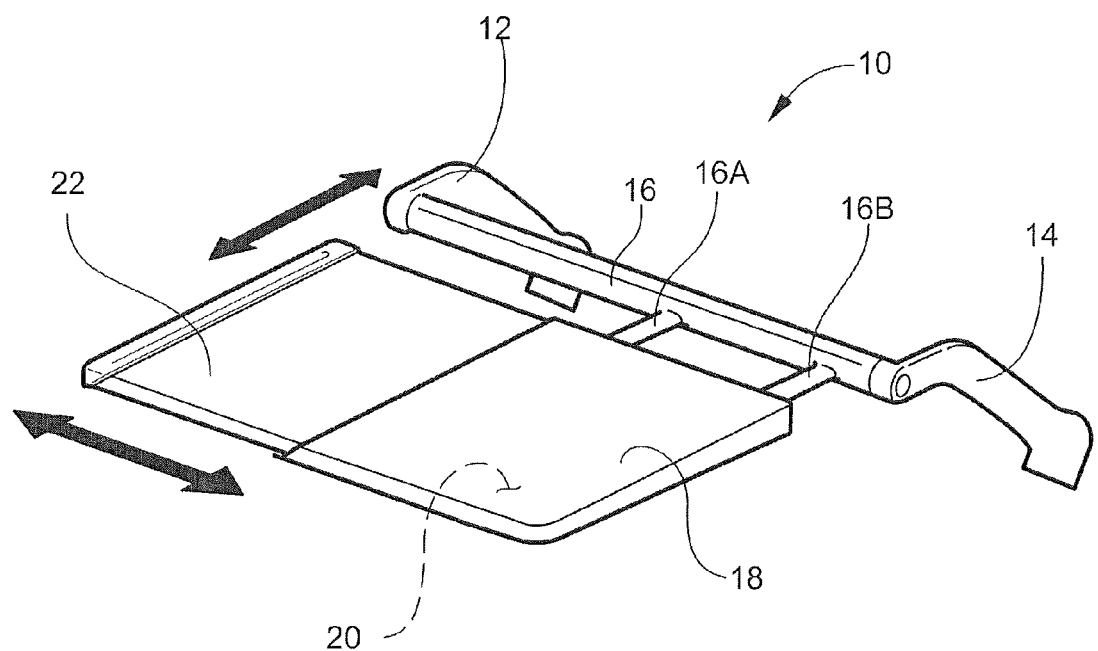
FIG. 3 is a fragmentary perspective view of the telescoping tray table showing lateral and fore and aft movement.

Referring now to FIGS. 2 and 3, tray table 10 includes an arm assembly with a pair of laterally-opposed arms 12, 14 connected by a pivotally-mounted stabilizing cross bar 16. As shown in FIG. 3, the cross bar 16 includes a pair of table supports 16A, 16B that provide support and permit the first table segment 18 to slide away from the seat back "S" towards the seat occupant, as desired.

The first table segment 18 is positioned for pivotal movement with the movement of the cross bar 16, as shown, and includes an interior pocket 20. A second table segment 22 is positioned for lateral sliding movement between a stored position shown in FIG. 1, a partially-deployed position in FIG. 2 and a deployed, use position in FIG. 3. The partially-deployed position shown in FIG. 2 may be extended to a fully-deployed position by continuing to withdraw the second table segment 22 from the pocket 20 in the first table segment 18 to arrive at the position shown in FIG. 3.

The second table segment 22 may be secured in its stored and/or deployed positions by any suitable latch, or may be retained in those positions by friction between the second table segment 22 and the contacting parts of the pocket 20. The interior pocket 20 may be secured in its stowed position against the seat back "S" with any suitable latching mechanism known in the art.

As observed in FIG. 1, the tray table 10 in its stowed position allows significant additional space on the seat back "S" for other uses, which may include placement of a passenger's electronic device, IFE components, video screen or the like.

The first and second table segments 18, 22 are constructed of lightweight plastic, resin or metal of the general type currently used for prior art tray tables and similar in-flight components.

Referring to FIG. 4, a tray table 30, shown in a partially deployed position, includes a pair of laterally-opposed arms 32, 34 connected by a stabilizing cross bar 36. A first table segment 38 is positioned for pivotal movement on the cross bar 36, as shown and in a manner as shown in FIG. 3. A second table segment 40 is positioned for lateral pivoting movement, as shown, between a stored position in a narrow pocket 42 positioned beneath the first table segment 38 and a deployed, use position. In the fully deployed, use position, the second table segment 40 is in lateral alignment with the first table segment 38. In the fully stored position, the second table segment 40 is positioned beneath the first table segment in the pocket 42. The second table segment 40 pivots around a mounting pin or similar attachment mechanism, not shown, carried by the first table segment 38.

The tray table 30 may be secured in its stowed position against the seat back "S" with any suitable latching mechanism known in the art. In its stowed position, the appearance of tray table 30 would be essentially the same as the tray table 10 of FIG. 1.

Referring to FIG. 5, a tray table 50, shown in a partially deployed position, includes a pair of laterally-opposed arms 52, 54 connected by a stabilizing cross bar 56. A first table segment 58 is positioned for pivotal movement on the cross bar 56, as shown and as illustrated in FIG. 5, and includes a hinge 60 extending fore and aft on the interior side, as shown. A second table segment 62 is attached to the hinge 60 for pivoting movement, as shown, in a counter clockwise direction between a stored position and a deployed, use position. In the fully deployed position, the second table segment 62 extends towards the arm 52 in lateral alignment with and in the same horizontal plane as the first table segment 58. In the fully stowed position, the second table segment 62 rests on the top surface of the first table segment 58.

The tray table 50 may be secured in its stowed position against the seat back "S" with any suitable latching mechanism known in the art. In its stowed position, the appearance of tray table 50 would be essentially the same as the tray table 10 of FIG. 1.

As with tray table 10, tray tables 30 and 50 in their stowed position allow significant additional space on the seat back "S" for other uses, which may include placement of a passenger's electronic device, IFE components, video screen or the like. Similarly, the first and second table segments 38, 42 and 58, 62 are constructed of lightweight plastic, resin or metal currently used for prior art tray tables and similar in-flight components.

Each of the above tray tables allow configurations in the areas not occupied by the tables when stowed that are not possible with a typical fore/aft expanding bifold table. In a typical bifold table, the aspect ratio of the table and the space it occupies when stowed is short and wide, which dictates a similar form factor to the space adjacent to it for items such as connectivity ports, IFE remote control devices and the like. Additionally, these novel tray table designs allow for multiple table sizes depending on how far the second table segment is extended. This design also eases ingress and egress when the tables 10, 30 and 50 are in their reduced size configuration.

A seat back tray table according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A seat back tray table for an aircraft passenger seat having a base, a seat bottom, and a seat back, the seat back tray table comprising:
    an arm assembly including a pair of laterally opposing arms pivotally attached to the seat back and a pivotally mounted stabilizing cross bar connecting the laterally opposing arms;
    a first table segment carried by the arm assembly and moveable with the arm assembly between a stowed position within or proximate a stowage area of the seat back and a deployed position aft of the stowage area; the first table segment including a pair of table supports extending from the pivotally mounted stabilizing cross bar and permitting the first table segment to slide away from the pivotally mounted stabilizing cross bar to an extended position and to slide toward the pivotally mounted stabilizing cross bar to a retracted position;
    a second table segment carried by the first table segment and moveable between a stored position within or proximate to the stowage area of the seat back and a position laterally-extended from the first table segment to increase the total surface area of the tray table when the first table segment is in the deployed position; and
    a pocket positioned on a bottom side of the first table segment, wherein the second table segment in its stored position is telescoped into the pocket in the first table segment and adapted to be translated laterally-outwardly from the pocket into the deployed, use position;
    wherein the first table segment encloses the pair of table supports when the first table segment is in the retracted position.

2. The seat back tray table according to claim 1, including passenger convenience devices positioned on a width of the seat back not occupied by the tray table in its stowed position.

3. The seat back tray table according to claim 2, wherein the passenger convenience devices are selected from the group consisting of an electronic device connectivity port, in-flight entertainment.

4. The seat back tray table according to claim 1, wherein the width of the tray table in the stowed position is approximately one-half of the width of the seat back, and the width of the tray table in the deployed position with the second table segment fully laterally-extended is substantially the entire width of the seat back.

* * * * *